United States Patent Office 3,210,325
Patented Oct. 5, 1965

3,210,325
COPOLYMERS OF POLYESTERS DERIVED FROM HYDROXYMETHYL STEARIC ACID
Elmer J. De Witt, Cuyahoga Falls, and Floyd L. Ramp and Richard H. Backderf, West Richfield, Ohio, assignors to The B. F. Goodrich Company, New York, N.Y., a corporation of New York
No Drawing. Filed Oct. 15, 1962, Ser. No. 230,736
13 Claims. (Cl. 260—78.5)

The present invention concerns novel, polymerzable, monounsaturated polyester monomers and self-plasticizing copolymers thereof with vinyl monomers. More particularly, this invention relates to unique, branched-chain polyesters having one polymerizable carbon to carbon double bond, an average molecular weight of from about 400 to about 2800 and the following generalized structures:

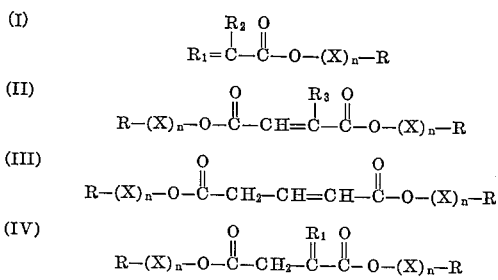

wherein R is selected from the group consisting of hydrogen and alkyl radicals having from one to eight carbon atoms; $R_1$ is selected from the group of $CH_2$ and $CHCH_3$; $R_2$ is selected from the group consisting of hydrogen and $CH_3$; $R_3$ is selected from the group consisting of hydrogen, $CH_3$ and $CH_2CH_3$; $n$ is an integer of from 1 to 4, and X is the radical

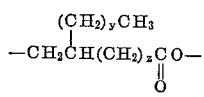

wherein $y$ is an integer of from 0 to 15 but preferably from 4 to 8, $z$ is an integer of from 0 to 15 but preferably from 7 to 11, and the total of $y$ plus $z$ is always equal to 15. In the above generalized structures I to IV, the terminal carbon atom of X is bound to an oxygen atom, and the terminal oxygen atom of X is bound (a) to a carbon atom; or (b) to a hydrogen atom (when R= hydrogen) and then said oxygen atom is part of a terminal acid group of which R is the terminal hydrogen in structures I to IV.

The invention also specifically pertains to copolymers of said monomeric polyesters with monomers containing the $CH_2=C<$ group, particularly the vinyl halides, and especially vinyl chloride. The copolymers are comprised of from about 50 to 80 percent of the vinyl compound and from about 20 to 50 percent of the polyester based on the total weight of coplymer. They are resinous, thermoplastic materials which are resilient and flexible, that is to say, "internally plasticized" vinyl polymers.

Conventional externally plasticized vinyl resins, that is, resins blended with varying amounts of the well known phosphate esters, phthalate esters, hydroxy acid esters, polyol esters, diesters, and the like, are inherently deficient in certain respects. The plasticizer component of the blend, being more volatile, shows a decrease in its proportion of the total resin weight as the material ages. The plasticizer also migrates to and sweats out of the surface of the resin and is extracted by oils and soapy water.

It is an object of this invention to provide a novel polyester monomer prepared in a simple manner from cheap, easily obtainable raw materials. It is a further object to provide copolymers of this polyester and vinyl monomers that have the softness, resiliency, and flexibility of externally plasticized polyvinyl resins without their serious drawbacks. The invention will be readily understood from the following detailed description.

THE POLYESTER MONOMER

The mono-unsaturated polyester monomer of this invention contains from one to eight groups of a hydroxymethyl stearic acid moiety and one group of an alpha, beta-ethylenically unsaturated carboxylic or dicarboxylic acid moiety having from 3 to 6 carbon atoms. Such acids include the monobasic acids, e.g., acrylic, crotonic, methacrylic; and the dibasic acids, e.g., fumaric, maleic, itaconic, citraconic, mesaconic, ethyl maleic, methyl itaconic, glutaconic, and the like. More particularly, the polyester monomer contains from one to four groups of the hydroxymethyl stearic acid moiety per one group of an $\alpha,\beta$-unsaturated monobasic acid moiety, and from two to eight groups of the hydroxymethyl stearic acid moiety per one group of an $\alpha,\beta$-unsaturated dibasic acid moiety. The preferred carboxylic acid is acrylic acid and the preferred dicarboxylic acids are fumaric and itaconic.

The polyesters can be prepared by reacting hydroxymethyl stearic acid with the $\alpha,\beta$-unsaturated acid, but the preferred manner of synthesis involves a transesterification reaction between an alkyl ester of the hydroxylmethyl stearic acid and an alkyl ester (or dialkyl ester) of the unsaturated carboxylic (or dicarboxylic) acid, wherein said alkyl radicals have from one to eight carbon atoms, for example, methyl, ethyl, n-propyl, isopropyl, n-butyl, isobutyl, n-amyl, isoamyl, n-hexyl, the isomeric hexyls, n-heptyl, the isomeric heptyls, n-octyl, and the isomeric octyls such as 2-ethylhexyl. The alkyl radicals containing from one to three carbon atoms are preferred. An anhydride or acid halide, preferably the acid chloride, may be used instead of the alkyl ester of the $\alpha,\beta$-unsaturated acid.

HYDROXYMETHYL STEARIC ACID

The hydroxymethyl stearic acid moiety is the "backbone" of the polyester monomer. The methylol derivative of stearic acid, or the methylol derivative of an alkyl ester of stearic acid, may be prepared from $C_{18}$ unsaturated fatty acids such as oleic acid and linoleic acid, the alkyl esters of these acids, and mixtures thereof. A convenient source of oleic and linoleic acids is the tall oil fatty acid fraction which is recovered by fractional distillation of crude tall oil, a mixture of rosin acids (related to abietic acid) and of fatty acids. Tall oil is obtained by acidifying the black liquor skimmings of the alkaline paper pulp industry. The fatty acids fraction separated from crude tall oil will generally contain approximately equal amounts of oleic and linoleic acids, not more than 2 percent of rosin acids, small amounts of saturated acids such as palmitic, adipic, and sebacic acids, and no linolenic acid. (See Kirk and Othmer, Encyclopedia of Chemical Technology, 1954, volume 13, pages 572–577.) For instance, commercial tall oil fatty acids derived from the kraft paper processing of the southern pine normally contain about 53% oleic acid, 42% linoleic acid, 3% saturated acids, and 2% rosin acids and unsaponifiables. Oleic acid, linoleic acid, and mixtures thereof are readily esterified with a $C_1$ to $C_8$ aliphatic alcohol by conventional means.

Several methods are known for hydroxymethylating an unsaturated fatty acid at a point of unsaturation on its chain. We found that it was advantageous to use the well known hydroformylation reaction, often referred to as the Oxo-process. The Oxo-reaction is widely used in industry to convert olefins to aldehydes and alcohols.

Generally speaking, the Oxo-process involves reacting olefinic compounds with carbon monoxide and hydrogen under high temperatures and pressures in the presence of a cobalt catalyst. Aldehydes are produced at the lower reaction temperatures, around 125° C., and as the temperature approaches 180° C. and above, the major product is an alcohol, although some aldehyde is still produced.

In our application of the Oxo-reaction the feed stock was either oleic acid, a mixture of oleic acid and linoleic acid (tall oil fatty acids), or the alkyl esters of said acids or acid mixtures. The reaction and chemistry are essentially the same for the acid and ester feed stocks. The reaction was carried out in a three-liter stainless steel autoclave. We chose as our catalyst from 0.5 to 1.5%, based on the weight of the feed stock, of cobalt in the form of dicobalt octacarbonyl charged as a solution in benzene. (A procedure for preparing this catalyst is given by I. Wender et al., J. Am. Chem. Soc., vol. 73, p. 2656.) Reaction temperature was about 180° C. to 200° C., pressure was 1425 to 2500 p.s.i.g., reaction time 0.25 to 1.0 hour, and the ratio of $H_2$ to CO in the synthesis gas ranged from 2:1 to 1:2. After the reaction was completed, the cobalt catalyst was decomposed by (1) venting the autoclave and treating the product with hydrogen at 160° C., or (2) treating the product with dilute hydrochloric acid solution at 100° C. The former method yielded a pink product containing metallic cobalt and cobalt salts. The latter method, the preferred technique, yielded a white to yellow thick oil product free of cobalt salts.

The product of the above described oxonation process, obtained in about 90 to 97% yield, is hydroxymethyl stearic acid (or alkyl hydroxymethyl stearate) containing from 3 to 10% aldehyde compounds. During oxonation some of the hydroxymethyl stearic acid (or ester of the acid) may be converted to a dimeric and trimeric ester product thereof. The compound's essential nature and characteristics, with respect to its utilization in the synthesis of the polyester monomer of this invention, as hereinafter more fully described, are not affected by such coupling. The aldehyde group in the oxo-product is converted to an alcohol (i.e., methylol) by any of several conventional reduction techniques, that include, for example, catalytic hydrogenation of the product in the presence of either palladium, platinum or Raney nickel catalyst, reduction with sodium borohydride ($NaBH_4$) in methanol-water medium, and the Meerwein-Pondorf-Verley method which comprises reacting the product with isopropanol in the presence of aluminum isopropoxide and heat and then treating the mixture with a dilute inorganic acid. The latter two methods are preferred over the catalytic hydrogenation method which does not always give complete reduction of the aldehyde functions.

In the hydroformylation of oleic (9-octadecenoic) and linoleic (9,12-octadecadienoic) acids, or esters, to obtain the methylol derivatives thereof, a mixture of isomers is produced due to (a) the tendency of the methylol function to add to either carbon atom of an unsaturated linkage, and (b) shifting of the double bonds along the chain of carbon atoms during reaction. Stated differently, the methylol function may be attached to any of the 2nd through 17th carbon atoms of the chain of the hydroxymethyl stearic acid moiety, but is generally located at any of the 9th through 13th carbon atoms of said chain. More explicitly, the hydroformylation of oleic acid produces a mixture largely comprised of 9- and 10-hydroxymethyl stearic acids, while the oxonation of linoleic acid produces a mixture largely comprised of 9-, 10-, 11-, 12-, and 13-hydroxymethyl stearic acids. In both cases small amounts of 2-, 3-, 4-, 5-, 6-, 7-, 8-, 14-, 15-, 16-, and 17-hydroxymethyl stearic acids are formed during reaction because of a relatively small amount of random bond shifting. The specific poistion of the reactive methylol group on the carbon chain of the stearic acid (alkyl stearate) moiety as described herein does not have a sagnificant effect on the properties of the polyester of this invention which is derived therefrom. The radical X, which was previously characterized in the aforedescribed generalized structures of the polyester monomers, is derived from the hydroxymethyl stearic acid unit which may be pictorially represented as

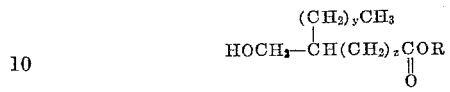

wherein R is selected from the group consisting of hydrogen and alkyl radicals having from one to eight carbon atoms, y and z are both integers within the range of 0 to 15, the total of integers y+z is always 15, and furthermore, y and z are predominantly from 7 to 8 when said hydroxymethyl compound is prepared from oleic acid, and y is predominantly from 4 to 8 and z from 7 to 11 when the hydroxymethyl compound is prepared from linoleic acid.

Surprisingly, the hydroxymethylation of linoleic acid by oxonation is predominantly selective toward one of the dougle bonds while the other one is hydrogenated. This prime consideration, in addition to simplicity and economy of operation, makes hydroformylation the desirable hydroxymethylation technique. No more than about one percent of the linoleic acid is converted to the dihydroxymethyl stearic acid. This extra functional group causes a small amount of cross-linking when the polyester monomer derived therefrom is copolymerized with a vinyl monomer in accordance with this invention.

PREPARATION OF THE POLYESTER MONOMER

As stated previously, the polyester monomer is conveniently prepared by reacting hydroxymethyl stearic acid with one of the aforementioned alpha,beta-ethylenically unsaturated carboxylic acids, and in the preferred embodiment, by reacting an alkyl hydroxymethyl stearate with an alkyl ester of the unsaturated acid wherein said alkyl groups have from 1 to 8 carbon atoms.

When the dicarboxylic acids or their esters are used in the synthesis of the polyester, the product is comprised of one $\alpha,\beta$-unsaturated acid moiety and from two to eight hydroxymethyl stearic acid moieties. For example, and again referring to the aforesaid generalized structures and descriptions thereof, maleic, fumaric, citraconic, mesaconic, ethyl maleic acids, or esters of said acids, when employed in the preparation of the polyester, give the structure:

(II) 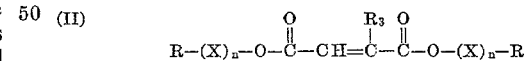

glutaconic acid or ester gives:

(III) 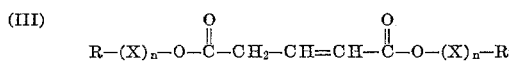

and itaconic and methyl itaconic acids or esters produce:

(IV) 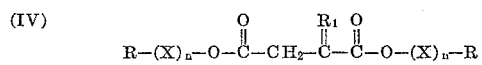

Again, n is an integer lying in the range of from one to four. In the preferred polyester, n is from one to two, and in the most preferred product, the total number of X radicals is from three to four. The average molecular weight of the polyester product resides in the range of from about 700 to about 2800 depending on the particular unsaturated acid moiety, the number of hydroxymethyl stearic acid (X) radicals, and the carbon chain length of the alkyl ester radicals incorporated therein. The average molecular weight of the most preferred polyester i.e., containing three to four X radicals, is from about 1000 to about 1600. It is understood, however, that the lower molecular weight product necessarily contains some of the higher molecular weight, more highly polymerized polyesters, and, of course, the reverse is also true.

A typical transesterification reaction involved in polyester synthesis, in this case between the ethyl esters of fumaric acid and 9-hydroxymethyl stearic acid, may be depicted as follows, the letters Et representing the ethyl radical.

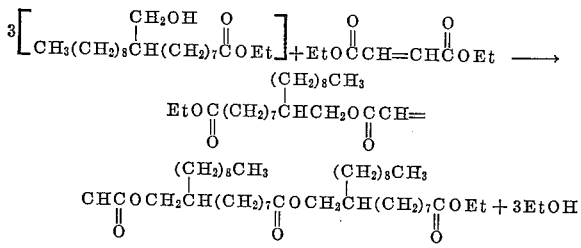

Thus, this type of polyester contains one polymerizable double bond and a unique and significant branched structure.

The reaction embodied herein is conveniently carried out using conventional esterification procedures. Generally, in order to produce the aforesaid preferred polyester in predominant proportions, the ratios of the amounts of reactants ranges from 1 mole of the alkyl ester of the α,β-unsaturated dicarboxylic acid per from about 3 to 4 moles of alkyl hydroxymethyl stearate. A large excess of the unsaturated acid moiety is permissable, but this technique requires a later removal of the unreacted excess from the product by distillation. Standard esterification catalysts such as sulfuric acid, p-toluene sulfonic acid, titanium tetrachloride, Lewis acids, etc., may be used, but the preferred catalysts are of the organometallic type, such as tetrabutyl titanate, dibutyl tin oxide, and the like. The catalyst concentration may range from about 0.01 to 2%, based on the weight of the reactants, with from 0.05 to 1.0% being preferred. The reaction temperature can be from 160 to 225° C. but from about 160 to 205° C. is most desirable. From about 1 to 4 hours are required to complete the ester interchange and form the polyester in good yield. When preparing the higher molecular weight polyesters, the foregoing esterification conditions are employed except that the reaction period is extended to from greater than 4 to about 6 hours. The reaction may be continued before or after removal of low boiling contaminants from the system. Similarly, reduced reaction periods will produce a polyester mixture containing proportionately more of lower molecular weight compounds, thus decreasing the average molecular weight.

When the above-described transesterification technique (for preparing the preferred polyesters using an unsaturated dibasic acid) is employed to synthesize the polyester from alkyl hydroxymethyl stearate and the alkyl ester of an α,β-unsaturated monobasic acid such as acrylic, methacrylic, and crotonic, the product having the generalized structure previously designated as (I) is usually comprised of two to four hydroxymethyl sterate units per unsaturated acid unit and has an average molecular weight within the range of from about 600 to about 1400, depending on the particular alkyl ester radical and acid moiety found therein; however, lower molecular weight polyesters also will be present in small amounts. The reaction, in this simplified case involving the ethyl esters of 9-hydroxymethyl stearic acid and acrylic acid, may be represented by the following pictorialization:

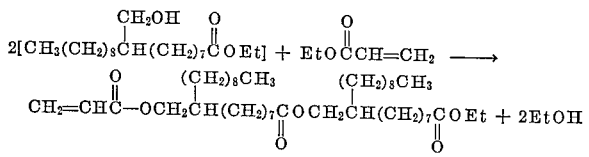

When milder reaction conditions are applied, such as less active catalysts and/or lower temperatures, or when the unsaturated acid chloride or anhydride is used instead of the corresponding monobasic acid or ester, the polyester product is usually comprised of just one hydroxymethyl stearate unit per unit of the unsaturated acid. The average molecular weight ranges from about 400 to about 500. This product may also contain a portion of the aforesaid polyester wherein there are mutiple hydroxymethyl stearate groups per the unsaturated acid moiety.

Because of the reactivity of acrylic acid and alkyl acrylates, epsecially ethyl acrylate, it is desirable to add an inhibitor to a polyester reaction system which involves such compounds in order to retard homopolymerization of the acrylic monomer. Suitable inhibitors include methylene blue (from 0.1 to 1.0 part per 100 parts of acrylic monomer) and nitric oxide (small amounts bubbled through the reaction mass). The best inhibitor-catalyst system is nitric oxide inhibitor and heptafluorobutyric acid catalyst (from 1 to 10 parts of acid per 100 parts of total monomers).

The process embodied herein is subject to various modifications. For instance, the acid halide or anhydride of the α,β-unsaturated acid can be used instead of the ester or acid in the polyester synthesis reaction. In these embodiments lower reaction temperatures, e.g., from about 80° to 140° F. are preferred. An inert, reaction mixture diluent such as benzene, toluene, octane, etc., is desirable. A material such as sodium carbonate, potassium carbonate, calicum carbonate, etc. is present in a proportion of from approximately 1 to 4 moles per mole of the acid halide in order to neutralize the hydrogen chloride by-product of the reaction. This neutralizer is otherwise inert to the reaction.

Other modifications and variations are encompassed within the scope of the process embodied herein for producing our novel polyester monomer. For example, the alkyl ester of hydroxymethyl stearic acid can be dimerized or trimerized by conventional esterification methods and this product then reacted with the α,β-unsaturated monobasic acid, the alkyl ester, or acid chloride derivative thereof.

The following specific examples pertaining to the polyester synthesis are presented to illustrate but not to limit the invention.

*Example 1*

PREPARATION OF POLYESTER MONOMER OF HYDROXYMETHYL STEARIC ACID AND FUMARIC ACID VIA TRANSESTERIFICATION OF THE ETHYL ESTERS OF THE ACIDS

A one-liter glass flask equipped with a heating mantle, simple still head, thermometer, condenser and means for applying a vacuum thereto using a vacuum pump, was charged with 297 grams (0.87 mole) of ethyl hydroxymethyl stearate, 45 grams (0.26 mole) of diethyl fumarate, and 3.5 grams of tetrabutyl titanate catalyst (1% by weight of reactants). The reactants were maintained under a nitrogen blanket at a temperature of 185° C. and at essentially atmospheric pressure for four hours. The heating was then discontinued and a vacum applied for about ten minutes to remove final traces of by-product ethanol. The product in the flask, a brown oil, was cooled and diluted with about one liter of diethyl ether. This ether solution was water washed, dried over sodium sulfate, and filtered. The ether was removed by low-temperature distillation. The ether-stripped product was passed through a rotofilm still using a wall temperature of about 170° C. and an absolute pressure of 0.08 to 0.1 mm. of Hg, thereby ensuring removal of small amounts of volatile contaminants. 274 grams of the fumarated polyester resembling a reddish-brown, odorless, viscous oil were recovered. Its molecular weight, as determined by the "Isopiestic Method," was about 1250.

*Example 2*

The reaction technique of Example 1 was followed with some modifications. The charge was 398 grams (1.16 moles) of ethyl hydroxymethyl stearate, 71.5 grams (0.42 mole) of diethyl fumarate and 3.8 grams of tetrabutyl titanate (0.8% by weight of reactants). In this run the reactants were stirred during transesterification by means of a magnetic bar stirrer. The product was not subjected to the ether solvation-water wash treatment prior to the rotofilm treatment to remove volatile contaminants. 368 grams of the polyester product were recovered. It was a brown viscous oil (viscosity by Ostwald viscometer at 25° C.=872 centistokes, at 50° C.=330 centistokes) and its molecular weight, as determined by the "Cryoscopic Method," was 1245. A portion of this product was held at 185° C. at 0.1 mm. Hg pressure for 1.5 hours. The viscosity of the resulting more highly polymerized polyester was 15,550 centistokes at 25° C. indicating that the average molecular weight was around 2700.

*Examples 3, 4 and 5*

The procedure of Example 2 was employed in the following runs with certain modifications as set forth in the following tabulation of the data. A two-liter reaction flask was used for the runs involving the larger amounts of reactants.

|  | Example 3 | Example 4 | Example 5 |
|---|---|---|---|
| Charge: |  |  |  |
| (a) Ethyl hydroxymethyl stearate— |  |  |  |
| Gms | 484.5 | 790 | 951 |
| Mols | 1.4 | 2.3 | 2.77 |
| (b) Diethyl fumarate— |  |  |  |
| Gms | 70.0 | 105 | 150 |
| Mols | 0.41 | 0.67 | 0.87 |
| (c) Tetrabutyl titanate— |  |  |  |
| Gms | 1.0 | 0.4 | 1.0 |
| Percent of (a) and (b) | 0.2 | 0.05 | 0.09 |
| Transesterification conditions: |  |  |  |
| Temperature, ° C | 165-170 | 165-200 | 175-190 |
| Time, hours | 4 | 3.5 | 3 |
| Polyester product: |  |  |  |
| Amount recovered, gms | 421 | 814 | 884 |
| Appearance | (1) | (2) | (2) |
| Viscosity³ at 50 °C., centistokes | 241 | 197 | 259 |
| Molecular weight | 1,400 | 1,100 | 1,170 |

¹ Brown viscous oil.
² Yellow viscous oil.
³ By Ostwald viscometer.

*Example 6*

PREPARATION OF POLYESTER MONOMER OF HYDROXYMETHYL STEARIC ACID AND ITACONIC ACID VIA TRANSESTERIFICATION OF THE LOWER ALKYL ESTERS OF THE ACIDS 46 grams (0.13 mole) of ethyl hydroxymethyl stearate and 7.5 grams (0.47 mole) of dimethyl itaconate were reacted for one hour at 170–190° C. under a nitrogen blanket and in the presence of 0.55 gram of tetrabutyl titanate catalyst (about 1% of reactants). A vacuum was occasionally applied to the reaction flask during transesterification to aid in removal of by-product methanol. Following this transesterification period, the reactants were put through a rotofilm still at 190° C. (wall temperature) and 0.2 mm. Hg absolute pressure to insure complete removal of low boiling components from the polyester. 43 grams of product were recovered. The polyester was a brown viscous oil having an average molecular weight of about 1100.

*Example 7*

PREPARATION OF POLYESTER MONOMER OF HYDROXYMETHYL STEARIC ACID AND ACRYLIC ACID VIA TRANSESTERIFICATION OF THE ETHYL ESTERS OF THE ACIDS 1000 grams of ethyl hydroxymethyl stearic acid were dissolved in about 4000 grams of ethyl acrylate in a distillation flask equipped with a packed distillation column. A slow stream of a nitrogen-nitric oxide gas mixture was sparged through the solution which was brought to reflux temperature, about 100° C. At this point 50 grams of heptafluorobutyric acid (catalyst) were added. Reaction was continued for about twelve hours during which period by-product ethanol was taken off. The solution was then cooled and sparged with nitrogen to strip out the nitric oxide (inhibitor). The excess ethyl acrylate was removed into a rotoevaporator at 30 to 40° C. and 1.0 mm. Hg pressure. The product was dissolved in three volumes of diethyl ether, the solution washed twice with cold (0° C.) 2% sodium bicarbonate solution, twice with cold water, and once with saturated sodium chloride solution, filtered and dried. The diethyl ether was stripped at 60° C. and 2.0 mm. Hg pressure to yield the polyester, a clear, pale yellow oil composed of about two hydroxymethyl stearic acid units per acrylate unit and having an average molecular weight of about 750.

*Example 8*

PREPARATION OF POLYESTER MONOMER OF HYDROXYMETHYL STEARIC ACID AND ACRYLIC ACID VIA TRANSESTERIFICATION REACTION OF DIMER OF ETHYL HYDROXYMETHYL STEARATE AND ACRYLYL CHLORIDE 362 grams of ethyl hydroxymethyl stearate were reacted at about 200° C. for one hour in the presence of 1 gram of tetrabutyl titanate catalyst to split out a molecule of ethanol and produce a dimeric polyester of ethyl hydroxymethyl stearate having an average molecular weight of about 660. A two-liter flask equipped with a stirrer, thermometer and dropping funnel was charged with 332 grams (0.5 mole) of said dimeric polyester, 1000 ml. of benzene (diluent), 90.5 grams (1 mole) of acrylyl chloride, and 270 grams (2.5 moles) of sodium carbonate. This mixture was heated with stirring at 40–45° C. for about 16 hours. The sodium carbonate was present to neutralize the hydrogen chloride evolved from the reaction of the acrylyl chloride with the dimeric ethyl hydroxymethyl stearate in the formation of the acrylated polyester. Two liters of ice-water were added with stirring to the mixture to hydrolyze excess acrylyl chloride. About one liter of diethyl ether was added and the water layer discarded. The ether layer was water-washed to remove all traces of acidity and dried by contact with calcium sulfate crystals. The ether and benzene were stripped at 50 to 60° C. and 1.0 mm. Hg in a rotoevaporator to yield 343 grams of polyester having an average molecular weight of about 700.

*Example 9*

200 grams (0.375 mole) of ethyl hydroxymethyl stearate consisting of a mixture of about 60% dimer polyester of ethyl hydroxymethyl stearate and the remainder unreacted mono-ester and having an average molecular weight of about 534 were charged to a two-liter flask equipped with a stirrer, thermometer, etc., together with 68 grams (0.750 mole) of acrylyl chloride, 159 grams (1.5 moles) of sodium carbonate, 0.5 gram of methylene blue (inhibitor), and 500 ml. of benzene. The mixture was stirred for 16 hours at 30° C. The polyester product was recovered after ether dilution, water washing, etc. as per the procedure of Example 8. The polyester, a yellow oil, had an average molecular weight of about 600.

*Example 10*

PREPARATION OF METHYL HYDROXYMETHYL STEARATE AND ACRYLATION THEREOF WITH ACRYLYL CHLORIDE TO GIVE POLYESTER MONOMER 169.4 grams of hydroxymethyl stearic acid were dissolved in about 800 grams of methanol containing 35 grams of anhydrous HCl. The solution was held at 65° C. (reflux) for 16 hours, then cooled and mixed with 1.5 liters of cold water and 1 liter of diethyl ether. The ether layer was separated, water washed, and dried over calcium sulfate crystals. The ether was distilled in a rotoevaporator at 95° C. to leave 168 grams of methyl hydroxymethyl stearate. 154 grams of this compound were reacted with 49 grams of acrylyl chloride in 500 ml. of benzene diluent containing 160 grams of sodium carbonate using the procedure of Example 8. 163 grams of a monomeric polyester having an average molecular weight of about 400 were recovered.

THE COPOLYMERS OF THE POLYESTER MONOMER AND VINYL TYPE MONOMERS

The mono-unsaturated polyesters can be copolymerized with a $CH_2=C<$ containing monomer to form a unique, resinous, thermoplastic copolymer having a non-extractable, chemically bound plasticizing ingredient. Most preferred of the $CH_2=C<$ containing monomers are the vinyl halides such as vinyl chloride, vinyl bromide, vinyl fluoride, vinylidene chloride, vinylidene bromide, and vinylidene fluoride. Styrene also is a preferred monomer for copolymerization with the polyester. These monomers normally form especially tough and hard homopolymers ideally suited to plasticization by the polyester monomer. Also included in this invention are the terpolymers of the novel polyester with vinyl chloride and minor amounts of another copolymerizable monoolefinic monomer containing a $CH_2=C<$ group such as vinylidene chloride; the vinyl esters such as vinyl acetate, vinyl butyrate, vinyl benzoate, and the like; acrylic and alpha-alkyl acrylic acids, their alkyl esters, amides, and nitriles such as acrylic acid, methacrylic acid, ethyl acrylate, methyl methacrylate, octyl acrylate, acrylamide, acrylonitrile, and the like, and others of these types normally polymerizable with vinyl chloride. The weight ratio of the vinyl chloride to said other copolymerizable monoolefinic monomer may be from about 1:1 to 99:1.

The plasticizing polyester groups in the copolymer or terpolymer can range from about 20 to 50% by weight, based on the total weight of the resinous copolymer. Most preferred are the resins containing from 30 to 45% of the polyester groups.

The polymerization of the vinyl monomers-polyester monomer mixture can be carried out by the well known bulk, solution, emulsion, and suspension techniques. The bulk and solution polymerization methods are least preferred because of the comparatively lower conversions obtained. The polymerizations in aqueous medium, i.e., the emulsion and suspension methods, are more suited to the reaction, especially when a specific reactor charging procedure as hereinafter described is used. The special loading procedure, although not a necessary step, does, however, result in a better product. Although the results are substantially the same, the suspension method is slightly preferred over emulsion polymerization.

The difference between the suspension and emulsion processes is discussed in the book "Vinyl and Related Polymers" by C. A. Schildknecht, John Wiley & Sons, Inc., 1952, pages 393–398. The processes are covered in considerable detail in chapters III and IV, pages 69–174 of the book, "Polymer Processes," Interscience Publishers, Inc., 1956, edited by C. A. Schildknecht. Generally speaking, in suspension polymerization the mixture of monomers is dispersed by mechanical agitation into droplets suspended in the aqueous phase. The monomer droplets are then polymerized while dispersion is maintained by continuous agitation. Dispersing agents are present in the water to hinder the coalescence of droplets during polymerization. Emulsion polymerization, on the other hand, depends directly upon dissolved soaps, or true surface active solubilizing and emulsifying agents, for the permanent solubilization and dispersion of the monomer and then polymer in the aqueous phase. The polymer particles are considerably smaller than in the suspension process resulting in a latex-type product of permanently dispersed product which may be recovered, if desired, by well-known methods of coagulation or spray drying. Polymerization initiators or catalysts soluble in the monomer phase are generally used in suspension polymerization, while water-soluble initiators are preferred in the emulsion technique, but both types are operative and used in either system with success. The suspension and emulsion polymerization of vinyl monomers may be carried out at temperatures of from 0° to 100° C., but usually a range of from 20° to 60° C. is preferred. For purposes of brevity the discussion below will emphasize the suspension pocess for the polymerization of the copolymers of this invention.

The free-radical initiators useful in the polymerization herein include chemicals which decompose to produce free radicals under the reaction conditions imposed on the mixture, as well as various forms of actinic radiation such as ultraviolet light and X-rays. Well known free-radical initiators include the peroxides, hydroperoxides, azo compounds, redox catalysts, and the like, such as potassium persulfate, ammonium persulfate, sodium persulfate, hydrogen peroxide, potassium perphosphate, tert-butyl peroxide, benzoyl peroxide, caprylyl peroxide, diisopropylpercarbonate, azobisisobutyronitrile, and others. The alkyl borane-peroxide catalyst systems disclosed in U.S. Patent 3,025,284 also give good results. The preferred initiators are caprylyl peroxide, azobisisobutyronitrile, diisopropylpercarbonate and the system of triisobutyl borane and hydrogen peroxide. The initiator concentration ranges from about .05 to about 0.5 part per 100 parts of monomers by weight.

The polymerization recipes can contain from about 100 to 400 parts of water per 100 parts by weight of monomers with from 200 to 300 parts of water per 100 parts of monomers the preferred range. Suspending agents are present in concentrations of from about 0.5 to 3.0 parts per 100 parts by weight of monomers, and include the well known dispersants such as methyl hydroxypropyl cellulose, hydroxyethyl cellulose, polyvinyl alcohol, vinyl acetate-maleic acid copolymers, the water soluble phenol-formaldehyde resins, the sulfonated compounds such as the sodium alkylnaphthalene sulfonates, the sodium alkyl aryl polyestersulfonates, and others. A comprehensive list of suspending agents is presented on pages 78–81 of the book "Polymer Processes" cited above.

The copolymers embodied herein are conveniently prepared at a temperature of from about 20 to 60° C., preferably at from 45 to 55° C. Normal reaction periods range from about 10 to 20 hours. The conversion of monomers to copolymer under these operating conditions ranges from about 50 to about 85%.

The following examples illustrate the copolymerization of vinyl containing monomers with the novel polyesters of this invention to yield unique polymers exhibiting "internal plasticization." The suspension-type polymerizations were run in bottles equipped with caps lined with benzene-extracted neoprene puncture seals. The bottles were loaded with the polymerization mixture and tumbled overnight in a constant temperature bath.

The loading technique preparatory to polymerization was found to have an unexpected effect upon the properties of the copolymer product, especially those wherein vinyl chloride is the major constituent. The procedure initially employed consisted in charging the water, catalyst, and polyester comonomer into the bottle, cooling to 0° C., then pouring in excess vinyl chloride, allowing the excess to boil off, capping the bottle, shaking vigorously and inserting the bottle in the tumbling apparatus. The copolymers obtained as a result of this technique were cloudy and waxy indicating the the suspension of monomer droplets in the aqueous phase had not been of uniform composition despite the vigorous shaking. The monomers had polymerized to a small extent independently of each other thus creating a slight amount of incompatability.

The above difficulty was alleviated by revising the loading technique. The improved procedure involves preparing a solution of the polyester comonomer and vinyl chloride and transferring this solution to the aqueous phase containing the dispersing agent. This method results in a uniform monomer droplet phase and a copolymer product of complete compatibility with respect to the copolymeric constituents. In the application of this loading technique, the polymerization catalyst is dissolved in either the monomers solution phase or in the aqueous phase (prior to the admixing of said phases) depending on the relative solubility of the particular catalyst, that is, the catalyst is charged to the medium which is the best solvent therefor. If the catalyst is in the solution of monomers, this phase should be transferred immediately to the aqueous medium so as to keep the amount of the less desirable bulk polymerization to a minimum. Likewise, if the catalyst is in the water layer, there should be no unnecessary delay in adding the monomers solution thereto, so as to avoid possible contamination of the catalyst (resulting in reduced activity) during the interim.

*Example 11*

A copolymer of vinyl chloride and the fumarated polyester comonomer synthesized by the procedure of Example 1 was prepared in suspension using the following recipe:

| | Parts, wt. |
|---|---|
| Vinyl chloride monomer | 65 |
| Fumarated polyester monomer (Exp. 1) | 35 |
| Caprylyl peroxide (catalyst) | 0.56 |
| Nekal AEMA [1] | 0.7 |
| NaHCO₃ (buffer) | 0.7 |
| Water | 300 |

[1] Anionic dispersing agent (sodium alkylnaphthalene sulfonates).

Reaction was carried out for 16 hours at a temperature of about 50° C. The copolymer was formed as a fine sand which was collected on a cheese-cloth filter, washed with ethanol in a Waring blender, and Soxhlet extracted with ether to remove unconverted monomer. The overall conversion of monomers to copolymer was 65%. The polymer contained about 45% by weight of fumarated polyester comonomer groups.

*Example 12*

The copolymerization procedure of Example 11 was substantially repeated using a starting mixture comprising 75 parts of vinyl chloride monomer, 40 parts of fumarated polyester comonomer prepared as in Example 4, 0.6 part of caprylyl peroxide, 0.8 part of suspending or dispersing agent (Nekal AEMA), 0.8 part of NaHCO₃, and 335 parts of water. The reaction bottle was tumbled at 50° C. for 20 hours. Monomer conversion to polymeric material was 80%. The produce contained about 30% by weight of polyester monomer groups.

*Example 13*

The procedure and charges of Example 12 were the same for this polymerization except that the comonomer was the fumarated polyester of ethyl hydroxymethyl stearate prepared as described in Example 5. The copolymer contained about 38% by weight of the polyester constituent.

*Examples 14 and 15*

The suspension polymerization technique of Example 11 was employed in these two runs. The polyester monomer was that prepared as described in Example 8, i.e., from the reaction of ethyl hydroxymethyl stearate and acrylyl chloride, average molecular weight=700. The data for these runs are summarized below.

| | Exp. 14 | Exp. 15 |
|---|---|---|
| Charge in parts by weight: | | |
| Vinyl chloride | 65 | 65 |
| Acrylated polyester (Exp. 8) | 35 | 35 |
| Caprylyl peroxide | 0.56 | 0.56 |
| NaHCO₃ | 0.72 | 0.70 |
| Nekal AEMA | 0.72 | 0.70 |
| Water | 300 | 290 |
| Conversion to polymer, percent | 66 | 73 |
| Polyester in copolymer, wt. percent | 37 | 40 |

*Example 16*

The acrylated polyester of Example 9 was copolymerized with vinyl chloride in the aforedescribed manner at a temperature of 50° C. and a reaction period of 18 hours. The initial charge was 65 grams of vinyl chloride, 35 grams of polyester, 0.57 gram of caprylyl peroxide, 0.72 gram of Nekal, 0.72 gram of NaHCO₃, and 300 grams of water. The conversion of monomers was 56% to a copolymer which contained about 36% polyester groups.

*Example 17*

The recipe for this run was 111 grams of vinyl chloride, 60 grams of relatively low molecular weight acrylated polyester (product of Example 10), 0.95 gram caprylyl peroxide, 1.2 grams Nekal, 1.2 grams NaHCO₃, and 510 grams of water. Conversion was 51%. The copolymer contained 38% of the polyester component.

COPOLYMER CHARACTERIZATION AND EVALUATION

Processability of the copolymers was determined by pressing the powders obtained from synthesis into sheets 0.5 mm. thick. The molding conditions were 200° C. and 10 seconds at about 1,000 p.s.i.g. The copolymers molded easily; the sheets were generally smooth, clear, and resilient with good plasticity. It was found that in the case of a copolymer having polyester groups containing methylol stearic segments derived from hydroformylation of linoleic acid, a stronger, clearer sheet was obtained if the plastic was worked on a "cold" (unheated) roll mill for about 5 to 10 minutes prior to the molding thereof. It is believed that this cold rolling destroys the light cross-linking in these particular copolymers.

In order to prepare samples of the copolymers for physical testing, the plastics were first cold-milled for approximately 10 minutes. Stock temperatures of from about 40° to 55° C. were generated during this operation. The milled materials were then pressed for three minutes at 182° C. and 1,000 p.s.i.g. into sheets 0.025 inch thick. The following physical tests and evaluations on representative specimens were performed on samples taken from these molded sheets; the data therefrom are tabulated in the appended Table A.

The $\Delta T$, equal to $T_2$ minus $T_1$, is a measure of the temperature range of useful flexibility and strength as determined by the dynamic extrusion test. $T_1$, roughly the second order transition temperature or softening point, the temperature where the material can be worked, and $T_2$, the melt flow temperature, were estimated using a dynamic extrusion rheometer. In the operation of this instrument the polymer sample is placed in chamber equipped with a plunger subjected to a load of 3,263, p.s.i. The sample is gradually heated to effect its ultimate extrusion through a 0.0625 inch diameter orifice. Plunger advance and temperature increase are measured. A plot of these values provides a curve from which $T_1$ and $T_2$ are obtained.

The cold brittle temperature was determined by ASTM test method D746–57T. The tensile strength, modulus of elasticity, and percentage elongation were measured by ASTM D638–60T. The creep properties were determined by subjecting dumbbell shaped specimens to a 400 p.s.i. stress at 70° F. for 48 hours and plotting elongation vs. time.

The percent extractable into tetrahydrofuran (THF) was determined by extracting a weighed sample of shredded copolymer overnight with THF in a Soxhlet apparatus. The extracted material was heated to 50° C. in a vacuum oven for two hours and then reweighed to determine weight loss.

The volatile loss property of the plastic was determined by ASTM D1203–55. The loss to soapy water extraction was determined using a 5% soap solution with a contact of 72 hours at 93° C.

The physical properties of representative copolymers of this invention embodied in the Examples 11–17 were compared with those of a high quality, easy-processing, general purpose, plasticized polyvinyl chloride resin ("Geon 101 EP"). This commercial resin was plasticized with 23, 29 and 33 weight percent of di-2-ethylhexyl phthalate, based on the total weight of the plasticized resin. The properties of these compositions are presented under Examples a, b and c, respectively. Contact test against lacquer surfaces showed that the copolymers of this invention are greatly superior to the conventional externally plasticized resins with respect to migration tendencies. Superiority of the copolymers with respect to heat loss and soapy water extraction also were readily apparent.

TABLE A

| Resin | $T_1$ | $T_2$ | $\Delta T$ | Cold brittle temp., °C. | Tensile strength, p.s.i. | 100% modulus, p.s.i. | Percent elong. | Percent creep | Percent permanent set 40 hr. recovery | Percent volatile loss 4 days at 90°C. | Percent volatile loss 7 days at 110°C. | Percent loss in soap solution | Percent extractable by THF |
|---|---|---|---|---|---|---|---|---|---|---|---|---|---|
| Example a | 30 | 111 | 81 | 0 | 3,700 | 3,100 | 260 | | | 1.3 | 12.5 | 6.5 | 100 |
| Example b | 18 | 108 | 90 | −10 | 3,300 | 2,400 | 280 | 60 | 12 | 1.6 | 14.5 | 10.6 | 100 |
| Example c | 8 | 106 | 98 | −25 | 3,100 | 1,700 | 340 | 100 | 23 | 1.9 | 18.4 | 11.4 | 100 |
| Example 11 | 3 | 83 | 80 | −20 | 4,000 | 3,400 | 120 | 84 | 26 | | 1.1 | | 23 |
| Example 12 | 30 | 110 | 80 | −30 | | | | | | | | | 62 |
| Example 13 | 22 | 110 | 88 | −30 | | | | | | | | | 28 |
| Example 14 | 30 | 112 | 82 | | 3,500 | 2,800 | 170 | | | | | | |
| Example 15 | 15 | 99 | 84 | −15 | 2,900 | 2,000 | 170 | 47 | 22 | | 0.9 | 0.1 | 21 |
| Example 16 | 14 | 84 | 70 | −25 | 2,000 | 1,600 | 150 | 42 | 29 | 0.2 | 1.7 | 0.5 | 50 |
| Example 17 | 21 | 95 | 74 | −20 | 2,100 | 1,700 | 180 | 98 | 35 | 0.2 | 2.3 | 1.5 | 50 |

The softness and resiliency of the copolymers are comparable to those of the plasticized "Geon" polyvinyl chloride. The compared cold brittle temperatures are either equivalent or superior.

It was noted that the $\Delta T$ (defined above) of copolymers having about the same amounts of the polyester monomer incorporated therein increases with increasing molecular weight of this component. A molecular weight for the polyester of at least above about 1,000 appears to be desirable to obtain the maximum temperature range of useful flexibility for the copolymers.

It is manifest that the invention as defined by the appended claims is capable of many variations and modifications without departing from the scope of its inventive concepts.

We claim:

1. An internally plasticized resin comprising a copolymer of (a) from about 50 to about 80 percent by weight of a monomer containing a $CH_2=C<$ group selected from the class consisting of vinyl chloride, vinyl bromide, vinyl fluoride, vinylidene chloride, vinylidene bromide, vinylidene fluoride, and styrene and (b) from about 20 to about 50 percent by weight of a polyester selected from the group represented by the structures:

(I) 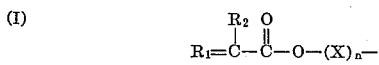

(II) 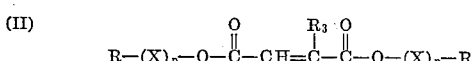

(III) 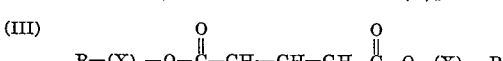

(IV) 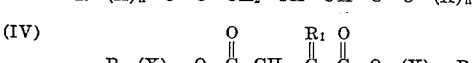

wherein R is selected from the group consisting of hydrogen and alkyl radicals having from one to eight carbon atoms; $R_1$ is selected from the group consisting of $CH_2$ and $CHCH_3$; and $R_2$ is selected from the group consisting of hydrogen and $CH_3$; $R_3$ is selected from the group consisting of hydrogen, $CH_3$ and $CH_2CH_3$; $n$ is an integer of from 1 to 4, and X is the radical

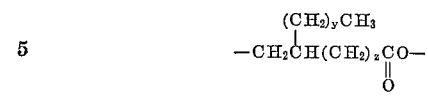

wherein $y$ is an integer of from 0 to 15, $z$ is an integer of from 0 to 15, the total of $y$ plus $z$ is equal to 15; and in the above structures I to IV, inclusive, the terminal carbon atom of X is bound to an oxygen atom.

2. A copolymer as defined in claim 1 wherein component (a) is from about 55 to about 70 percent by weight and component (b) is from about 30 to about 45 percent by weight.

3. A copolymer as defined in claim 1 wherein the $CH_2=C<$ containing monomer is vinyl chloride.

4. A copolymer according to claim 3 wherein the number of X radicals in said polyester is from 2 to 4, and in the radical X: $y$ is in an integer of from 4 to 8, $z$ is an integer of from 7 to 11, and the total of $y$ plus $z$ is equal to 15.

5. An internally plasticized resin comprising a terpolymer of (a) from about 50 to about 80 percent by weight of (1) vinyl chloride and (2) one other monoolefinic monomer copolymerizable therewith and containing a $CH_2=CH<$ group; and the weight ratio of vinyl chloride to said other copolymerizable monomer is from about 1:1 to 99:1 and (b) from about 20 to about 50 percent by weight of a polyester selected from the group represented by the structures:

(I) 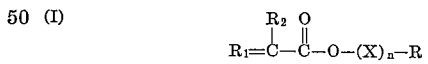

(II) 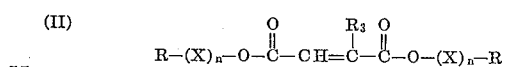

(III) 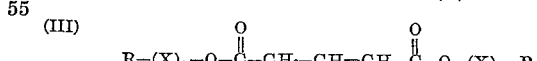

(IV) 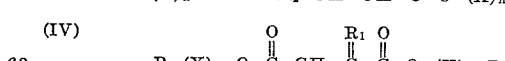

wherein R is selected from the group consisting of hydrogen and alkyl radicals having from one to eight carbon atoms; $R_1$ is selected from the group consisting of $CH_2$ and $CHCH_3$; $R_2$ is selected from the group consisting of hydrogen and $CH_3$; $R_3$ is selected from the group consisting of hydrogen, $CH_3$ and $CH_2CH_3$; $n$ is an integer of from 1 to 4, and X is the radical

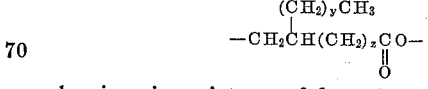

wherein $y$ is an integer of from 0 to 15, $z$ is an integer of from 0 to 15, the total of $y$ plus $z$ is equal to 15; and in the above structures I to IV, inclusive, the terminal carbon atom of X is bound to an oxygen atom.

6. A resin as defined in claim 5 wherein component (a) is from about 55 to about 70 percent by weight and component (b) is from about 30 to about 45 percent by weight.

7. An internally plasticized resin comprising a copolymer of (a) from about 55 to about 70 percent by weight of vinyl chloride and (b) from about 30 to about 45 percent by weight of a polyester having an average molecular weight of from about 400 to about 1400 and the structure:

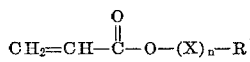

wherein R is selected from the group consisting of hydrogen and alkyl radicals having from one to eight carbon atoms, $n$ is an integer of from 1 to 4, and X is the radical

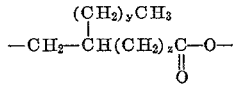

wherein $y$ is an integer of from 0 to 15, $z$ is an integer of from 0 to 15, and the total of $y+z$ is equal to 15, and in the polyester the terminal carbon atom of X is bound to an oxygen atom.

8. An internally plasticized resin comprising a copolymer of (a) from about 55 to about 70 percent by weight of vinyl chloride and (b) from about 30 to about 45 percent by weight of a polyester having an average molecular weight of from about 700 to about 2800 and the structure:

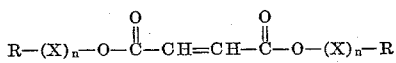

wherein R is selected from the group consisting of hydrogen and alkyl radicals having from one to eight carbon atoms, $n$ is an integer of from 1 to 4, and X is the radical

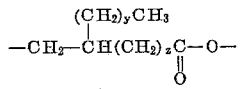

wherein $y$ is an integer of from 0 to 15, $z$ is an integer of from 0 to 15, the total of $y+z$ is equal to 15, and in the polyester the terminal carbon atom of X is bound to an oxygen atom.

9. An internally plasticized resin comprising a copolymer of (a) from about 55 to about 70 percent by weight of vinyl chloride and (b) from about 30 to about 45 percent by weight of a polyester having an average molecular weight of from about 700 to about 2800 and the structure:

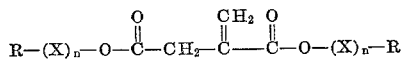

wherein R is selected from the group consisting of hydrogen and alkyl radicals having from one to eight carbon atoms, $n$ is an integer of from 1 to 4, and X is the radical

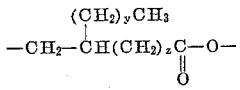

wherein $y$ is an integer of from 0 to 15, $z$ is an integer of from 0 to 15, the total of $y+z$ is equal to 15, and in the polyester the terminal carbon atom of X is bound to an oxygen atom.

10. An internally plasticized resin comprising a copolymer of (a) from about 55 to about 70 percent by weight of vinyl chloride and (b) from about 30 to about 45 percent by weight of a polyester having the structure:

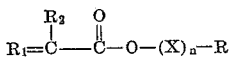

wherein R is selected from the group consisting of hydrogen and alkyl radicals having from one to eight carbon atoms; $R_1$ is selected from the group consisting of $CH_2$ and $CHCH_3$; $R_2$ is selected from the group consisting of hydrogen and $CH_3$; $n$ is an integer of from 1 to 4, and X is the radical

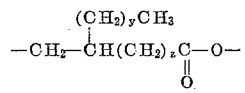

wherein $y$ is an integer of from 0 to 15, $z$ is an integer of from 0 to 15, the total $y+z$ is equal to 15, and in the polyester the terminal carbon atom of X is bound to an oxygen atom.

11. An internally plasticized resin comprising a copolymer of (a) from about 55 to about 70 percent by weight of vinyl chloride and (b) from about 30 to about 45 percent by weight of a polyester having the structure:

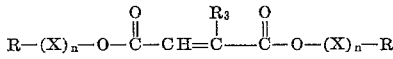

wherein R is selected from the group consisting of hydrogen and alkyl radicals having from one to eight carbon atoms; $R_3$ is selected from the group consisting of hydrogen, $CH_3$ and $CH_2CH_3$; $n$ is an integer of from 1 to 4, and X is the radical

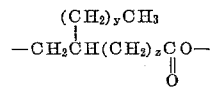

wherein $y$ is an integer of from 0 to 15, $z$ is an integer of from 0 to 15, the total of $y+z$ is equal to 15, and in the polyester the terminal carbon atom of X is bound to an oxygen atom.

12. An internally plasticized resin comprising a copolymer of (a) from about 55 to about 70 percent by weight of vinyl chloride and (b) from about 30 to about 45 percent by weight of a polyester having the structure:

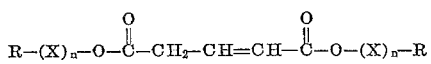

wherein R is selected from the group consisting of hydrogen and alkyl radicals having from one to eight carbon atoms, $n$ is an integer of from 1 to 4, and X is the radical

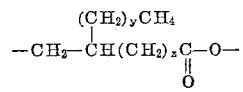

wherein $y$ is an integer of from 0 to 15, $z$ is an integer of from 0 to 15, the total of $y+z$ is equal to 15, and in the polyester the terminal carbon atom of X is bound to an oxygen atom.

13. An internally plasticized resin comprising a copolymer of (a) from about 55 to about 70 percent by weight of vinyl chloride and (b) from about 30 to about 45 percent by weight of a polyester having the structure:

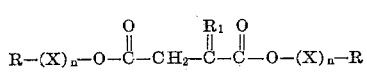

wherein R is selected from the group consisting of hydrogen and alkyl radicals having from one to eight carbon atoms; $R_1$ is selected from the group consisting of $CH_2$ and $CHCH_3$; $n$ is an integer of from 1 to 4, and X is the radical

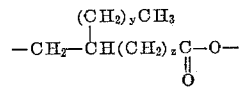

wherein $y$ is an integer from 0 to 15, $z$ is an integer of from 0 to 15, the total of $y+z$ is equal to 15, and in the polyester the terminal carbon atom of X is bound to an oxygen atom.

(References on following page)

References Cited by the Examiner

UNITED STATES PATENTS

| | | | |
|---|---|---|---|
| 2,502,606 | 4/50 | Ullmann | 260—404.8 |
| 2,569,420 | 9/51 | Kosmin | 260—404.8 |
| 2,839,509 | 6/58 | Garner | 260—78.5 |
| 2,845,404 | 7/58 | Garner et al. | 260—78.5 |
| 2,902,476 | 9/59 | Kern et al. | 260—78.5 |
| 2,906,745 | 9/59 | Levering | 260—23 X |
| 2,914,505 | 11/59 | Roper et al. | 260—78.5 |
| 3,004,958 | 10/61 | Berens | 260—86.7 |

LEON J. BERCOVITZ, *Primary Examiner.*

UNITED STATES PATENT OFFICE
CERTIFICATE OF CORRECTION

Patent No. 3,210,325                        October 5, 1965

Elmer J. De Witt et al.

It is hereby certified that error appears in the above numbered patent requiring correction and that the said Letters Patent should read as corrected below.

Column 1, line 58, for "coplymer" read -- copolymer --; column 4, line 2, for "sagnificant" read -- significant --; column 5, line 50, for "anunsaturated" read -- an unsaturated --; line 56, for "sterate" read -- stearate --; lines 65 to 71, the upper left-hand portion of the formula should appear as shown below instead of as in the patent:

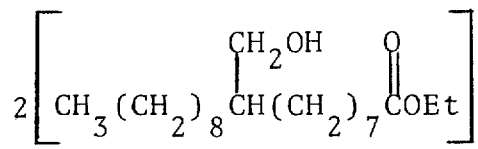

column 6, line 5, for "mutiple" read -- multiple --; line 8, for "epecially" read -- especially --; line 26, for "calicum" read -- calcium --; line 56, for "vacum" read -- vacuum --; column 10, line 64, for "the", first occurrence, read -- that --; column 11, line 48, for "produce" read -- product --; column 14, line 38, strike out "in".

Signed and sealed this 27th day of September 1966.

(SEAL)
Attest:

ERNEST W. SWIDER                              EDWARD J. BRENNER
Attesting Officer                          Commissioner of Patents